US008533139B2

(12) United States Patent
Jamriška et al.

(10) Patent No.: US 8,533,139 B2
(45) Date of Patent: Sep. 10, 2013

(54) OPTIMIZING COMPUTATION OF MINIMUM CUT IN GRAPHS WITH GRID TOPOLOGY

(75) Inventors: Ondřej Jamriška, Praha (CZ); Daniel Sýkora, Praha (CZ)

(73) Assignee: Czech Technical University in Prague, Faculty of Electrical Engineering, Prague (CZ)

(*) Notice: Subject to any disclaimer, the term of this patent is extended or adjusted under 35 U.S.C. 154(b) by 220 days.

(21) Appl. No.: 13/226,109

(22) Filed: Sep. 6, 2011

(65) Prior Publication Data
US 2013/0060724 A1    Mar. 7, 2013

(51) Int. Cl.
*G06F 17/00*    (2006.01)
*G06N 5/00*    (2006.01)

(52) U.S. Cl.
USPC .......................................................... 706/45

(58) Field of Classification Search
None
See application file for complete search history.

(56) References Cited

U.S. PATENT DOCUMENTS

| | | | |
|---|---|---|---|
| 6,744,923 B1 | 6/2004 | Zabih et al. | |
| 6,973,212 B2 | 12/2005 | Boykov et al. | |
| 7,444,019 B2 | 10/2008 | Boykov et al. | |
| 7,536,050 B2 | 5/2009 | Boykov et al. | |
| 7,844,113 B2 | 11/2010 | Delong et al. | |
| 2002/0048401 A1 | 4/2002 | Boykov et al. | |
| 2004/0008886 A1 | 1/2004 | Boykov | |
| 2009/0252416 A1* | 10/2009 | Komodakis et al. | 382/180 |

OTHER PUBLICATIONS

Liu et al. "Parallel graph-cuts by adaptive bottom-up merging", IEEE CVPR, 2010, pp. 2181-2188.*
Delong et al. ("A Scalable Graph-Cut Algorithm for N-D Grids", IEEE CVRP, 2008, pp. 8.*
Bader et al. "A Cache-Aware Parallel Implementation of the Push-Relabel Network Flow Algorithm and Experimental Evaluation of the Gap Relabeling Heuristic", PDCS 2005, pp. 8.*
Alahari et al., "Reduce, Reuse & Recycle: Efficiently Solving Multi-Label MRFs," Proc. IEEE Conf. on Computer Vision and Pattern Recognition, Jun. 23, 2008. http://ieeexplore.ieee.org/xpls/abs_all.jsp?arnumber=4587402&tag=1; http://research.microsoft.com/en-us/um/people/pkohli/papers/akt_cvpr08.pdf.
Arora et al., "An Efficient Graph Cut Algorithm for Computer Vision Problems," Proc. 11th European Conf. on Computer Vision, Part III, Sep. 5, 2010, pp. 552-565.

(Continued)

*Primary Examiner* — Li-Wu Chang
(74) *Attorney, Agent, or Firm* — Buchanan Ingersoll & Rooney PC (57) ABSTRACT

Approaches for optimizing computation of minimum cut or maximum flow on graphs comprising a plurality of nodes and edges with grid-like topologies are disclosed. Embodiments exploit the regular structure of input graphs to reduce the memory bandwidth—a main bottleneck of popular max-flow/min-cut algorithms based on finding augmenting paths on a residual graph (such as Ford-Fulkerson [1956] or Boykov-Kolmogorov [2004]). Disclosed embodiments allow more than 200% speed-up without sacrificing optimality of the final solution, which is crucial for many computer vision and graphics applications. Method and system embodiments replace standard linked list representation of general graphs with a set of compact data structures with blocked memory layout that enables fixed ordering of edges and implicit branchless addressing of nodes. The embodiments are orthogonal to other optimizations such as parallel processing or hierarchical methods and can be readily plugged into existing min-cut/max-flow computation systems to further improve their performance.

20 Claims, 8 Drawing Sheets

(56) References Cited

OTHER PUBLICATIONS

Boykov et al., "Graph cuts and efficient N-D Image Segmentation," International Journal of Computer Vision 70(2), Nov. 2006, pp. 109-131.

Boykov et al., "Interactive Graph Cuts for Optimal Boundary & Region Segmentation of Objects in N-D Images," Proc. Eighth International Conf. on Computer Vision, Vancouver, Canada, Jul. 7, 2001, vol. 1, pp. 105-112.

Boykov et al., "An Experimental Comparison of Min-Cut/Max-Flow Algorithms for Energy Minimization in Vision," IEEE Transactions on PAMI, Sep. 2004, vol. 26, No. 9, pp. 1124-1137.

Chandran et al., "A Computational Study of the Pseudoflow and Push-Relabel Algorithms for the Maximum Flow Problem," Operations Research, Mar. 2009, vol. 57 No. 2, pp. 358-376. http://or.journal.informs.org/content/57/2/358; http://riot.ieor.berkeley.edu/~dorit/pub/CH-OR.pdf.

Delong et al., "A Scalable Graph-Cut Algorithm for N-D Grids," IEEE Conf. on Computer Vision and Pattern Recognition (CVPR), Jun. 23, 2008, pp. 1-8.

Dixit et al., "GPU-Cuts: Combinatorial Optimisation, Graphic Processing Units and Adaptive Object Extraction," CERTIS, ENPC, France, Mar. 2005, pp. 1-16. http://www.enpc.fr/certis/.

Fishbain et al., "Competitive Analysis of Minimum-Cut Maximum Flow Algorithms in Vision Problems," Jul. 26, 2010, pp. 2-16. http://arxiv.org/abs/1007.4531v2.

Ford et al., "Maximal Flow Through a Network," Canadian Journal of Mathematics 8, 1956, pp. 399-404.

Goldberg et al., "Maximum Flows by Incremental Breadth-First Search," Proc. of ESA 2011 (LNCS), vol. 6942/2011, pp. 457-468. http://www.springerlink.com/content/q50p581644h05338/; http://research.microsoft.com/pubs/150437/ibfs-proc.pdf.

Harish et al., "Accelerating Large Graph Algorithms on the GPU Using CUDA," Proc. of International Conf. on High Performance Computing, Dec. 18, 2007, pp. 197-208. http://dl.acm.org/citation.cfm?id=1782200; http://citeseer.ist.psu.edu/viewdoc/summary?doi=10.1.1.102.4206.

Juan et al., "Active graph cuts," IEEE Conf. on Computer Vision and Pattern Recognition (CVPR), Jun. 2006, vol. I, pp. 1023-1029.

Juan et al., "Capacity Scaling for Graph Cuts in Vision," IEEE Conf. on Computer Vision, Oct. 14-21, 2007, pp. 1-8.

Kohli et al., "Dynamic Graph Cuts for Efficient Inference in Markov Random Fields," IEEE Transactions on Pattern Analysis and Machine Intelligence, vol. 29, No. 12, Dec. 2007, pp. 2079-2088.

Lempitsky et al., "Logcut—Efficient Graph Cut Optimization for Markov Random Fields," Proc. of International Conf. on Computer Vision, Oct. 14-20, 2007.

Liu et al., "Paint Selection," ACM Transactions on Graphics, vol. 28, No. 3, Aug. 2009, Article 69:1-7.

Liu et al., "Parallel Graph-Cuts by Adaptive Bottom-up Merging," Proc. of IEEE Conf. on Computer Vision and Pattern Recognition, Jun. 13, 2010, pp. 2181-2188. http://ieeexplore.ieee.org/xpls/abs_all.jsp?arnumber=5539898; http://research.microsoft.com/enus/um/people/jiansun/papers/CVPR10_ParallelGC.pdf.

Schmidt et al., "Efficient Planar Graph Cuts with Applications in Computer Vision," Proc. of IEEE Conf. on Computer Vision and Pattern Recognition, Jun. 20, 2009, pp. 351-356. http://ieeexplore.ieee.org/xpls/abs_all.jsp?arnumber=5206863; http://cvpr.in.tum.de/old/pub/pub/schmidt_et_al_cvpr09.pdf.

Strandmark et al., "Parallel and Distributed Graph Cuts by Dual Decomposition," Proc. of IEEE Conf. on Computer Vision and Pattern Recognition, Jun. 13, 2010, pp. 2085-2092. http://ieeexplore.ieee.org/xpls/abs_all.jsp?arnumber=5539886&tag=1; www.robots.ox.ac.uk/~vgg/rg/slides/parallelgraphcuts.pdf.

Vineet et al., "Cudacuts: Fast Graph Cuts on the GPU," Proc. of Computer Vision and Pattern Recognition Workshops, Jun. 23, 2008, pp. 1-8. http://ieeexplore.ieee.org/xpls/abs_all.jsp?arnumber=4563095; http://cvit.iiit.ac.in/papers/rtGCuts_2008.pdf.

\* cited by examiner

Six least significant bits of the nodes' indices inside a block

| 000000 | 000001 | 000010 | 000011 | 000100 | 000101 | 000110 | 000111 |
|--------|--------|--------|--------|--------|--------|--------|--------|
| 001000 | 001001 | 001010 | 001011 | 001100 | 001101 | 001110 | 001111 |
| 010000 | 010001 | 010010 | 010011 | 010100 | 010101 | 010110 | 010111 |
| 011000 | 011001 | 011010 | 011011 | 011100 | 011101 | 011110 | 011111 |
| 100000 | 100001 | 100010 | 100011 | 100100 | 100101 | 100110 | 100111 |
| 101000 | 101001 | 101010 | 101011 | 101100 | 101101 | 101110 | 101111 |
| 110000 | 110001 | 110010 | 110011 | 110100 | 110101 | 110110 | 110111 |
| 111000 | 111001 | 111010 | 111011 | 111100 | 111101 | 111110 | 111111 |

OPTIMIZING COMPUTATION OF MINIMUM CUT IN GRAPHS WITH GRID TOPOLOGY

FIELD OF THE INVENTION

The present invention is generally related to finding minimum cuts in graphs, and more specifically to systems and methods for improving the performance of minimum cut computation in image processing and computer vision applications by reducing the memory bandwidth bottleneck and avoiding latencies due to branching. In particular, embodiments of the invention improve the caching behavior when computing minimal cuts in graphs with grid-like topologies (i.e., topologies close to a regular lattice) by employing compact data structures, cache-aware memory layout and branchless implicit addressing of adjacent nodes.

BACKGROUND OF THE INVENTION

Many computer vision and graphics applications rely on finding minimal cuts in graphs, with many of these graphs having grid-like topologies. Examples of such computer vision and graphics problems include interactive two dimensional (2D)/three dimensional (3D) image and video segmentation, image restoration, painting, image fusion and re-targeting, texture synthesis, shape fitting, and 3D surface reconstruction.

One traditional approach of finding the minimum cut in a graph is the maximum flow/minimum cut algorithm by Boykov and Kolmogorov. The Boykov-Kolmogorov algorithm (BK algorithm) is in turn based on the Ford-Fulkerson algorithm, which repeats the process of finding and augmenting paths with non-zero residual capacities until no more paths remain. An added value of the BK algorithm as compared to the Ford-Fulkerson algorithm is the usage of two concurrent search trees together with a tree-reuse strategy to avoid loss of information gained during previous augmentations.

However, existing implementations of the BK algorithm pose significant challenges for application developers and interactive systems. For example, existing implementations of the BK algorithm are geared toward general graphs. This results in poor performance on grid-like graphs, since the memory bandwidth required when accessing the data structures necessary to represent general graphs is often the main bottleneck of the minimum cut computation.

Accordingly, what is needed are systems, methods, and computer program products that reduce the time needed to obtain a minimum cut in a grid-like graph by utilizing graph's regular structure to optimize the computation of the cut.

BRIEF SUMMARY

The present disclosure is directed to efficient computation of minimum cuts in graphs with topologies close to that of a grid. Exemplary methods, systems, and computer readable media are disclosed for speeding up the minimum cut computation by utilizing the regular structure of grid-like graphs to reduce the memory bandwidth bottleneck and avoid latencies due to branching, employing compact data structures, cache-aware memory layout, and branchless implicit addressing of adjacent nodes. Exemplary methods presented herein result in performance gains of more than double the speed of existing methods for graphs with dense terminal connections and up to triple the speed of existing methods for graphs with sparse terminal connections, without sacrificing optimality of the resulting cut. Such improvements are crucial, especially for interactive applications that strive to minimize a user's idle time while still providing accurate results. The methods, systems, and computer readable media disclosed herein are orthogonal to existing optimizations, such as parallel processing and multi-resolution methods. Thus, embodiments of the present invention can be easily incorporated into existing systems to further improve their performance.

Embodiments of the invention comprise methods, systems, and computer readable media that may improve the speed and efficiency of minimum cut computation by employing: compact and static data structures; a cache-aware memory layout; and implicit branchless addressing. By employing these elements, the methods, systems, and computer readable media disclosed herein speed-up the computation of minimum cut in graphs with topologies close to a regular grid.

BRIEF DESCRIPTION OF THE DRAWING/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION

Of particular concern to the present methods, systems, and computer readable media is the reduction of processing time required to obtain a minimum cut in a grid-like graph. According to an embodiment, minimum cut computation is optimized through implementation of an efficient variant of BK algorithm. In an embodiment, the BK algorithm is optimized for graphs with grid-like topologies.

In this way, embodiments of the present methods, systems, and computer readable media address a main bottleneck of the BK algorithm, which is the large amount of memory bandwidth needed when processing general graphs.

By exploiting the regular structure of grid-like graphs, embodiments presented herein considerably improve memory-caching behavior by employing compact data structures and cache-aware blocked memory layout with implicit branchless addressing. The modifications presented herein result in more than a 200% reduction in processing time for graphs with dense terminal connections and a 300% reduction in processing time for graphs with sparse terminal connections, without sacrificing optimality of an outputted final cut. As will be appreciated by persons skilled in the relevant art(s), such improvement is crucial especially for interactive applications where the aim is to minimize a user's idle time waiting for a final cut, and yet still provide accurate results.

The methods, systems, and computer readable media presented herein utilize the following elements: compact, static data structures; a cache-aware memory layout; and implicit branchless addressing. Each of these elements is described in detail in the following sections.

Compact and Static Data Structures

Embodiments of the present methods, systems, and computer readable media represent the distribution of flow using a residual graph. In accordance with an embodiment, for a residual graph, each edge has a residual capacity rc, which is the amount of flow that can be pushed along the edge with out exceeding its capacity. A residual graph is typically represented with adjacency list. In this representation, each node has a linked list of edges to adjacent nodes. By exploiting the regularity of a grid structure, embodiments of the present methods, systems, and computer readable media can represent the residual graph much more efficiently than traditional techniques.

Figure 2:
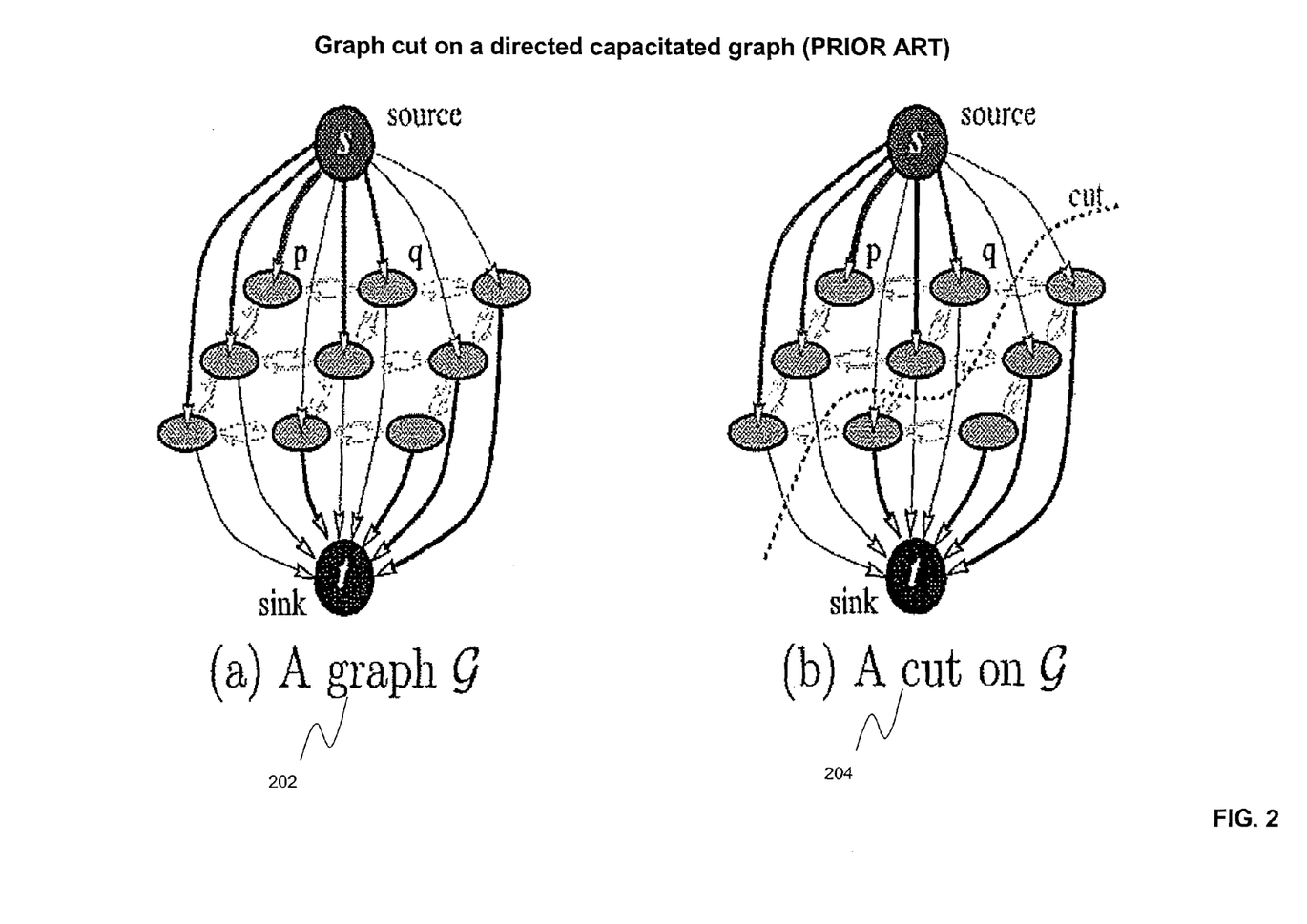
FIG. 2 provides an example of a directed capacitated graph wherein edge capacities are reflected by their thickness according to the prior art.

FIG. 2 depicts a directed capacitated graph 202 consisting of a set of nodes and a set of directed edges connecting the nodes. In graphs 202 and 204 the terminal nodes are labeled as the source, s, and the sink, t. The graph 202 has the topology of a 2-dimensional 4-connected grid (terminals and their adjacent nodes are not considered). In FIG. 2, the edge capacities are reflected by their relative thickness.

Existing implementations of the BK algorithm are geared toward general graphs. This results in a poor performance for graphs with grid-like topologies, such as graph 202 depicted in FIG. 2, because the memory bandwidth required when accessing data structures necessary to represent general graphs is often a bottleneck when computing the minimum cut.

Computation of minimum cut is important in many applications that employ discrete energy minimization to solve labeling problems. As illustrated in FIG. 2, the edges in graphs 202 and 204 are assigned some capacity. A capacity of a directed edge (p, q) may differ from the capacity of the reverse edge (q, p). An s/t cut C on a graph with two terminals is a partitioning of the nodes in the graph into two disjoint subsets S and T such that the source s is in S and the sink t is in T For simplicity, s/t cuts are referred to herein as cuts. Graph 204 depicts one example of a cut in a graph. Any s/t cut partitions the nodes of graph 202 into disjoint groups each containing exactly one terminal. Therefore, any cut corresponds to some assignment of nodes to labels (terminals). If edge capacities are appropriately set based on parameters of an energy, a minimum cut will correspond to a labeling with the minimum value of this energy.

Figure 3:
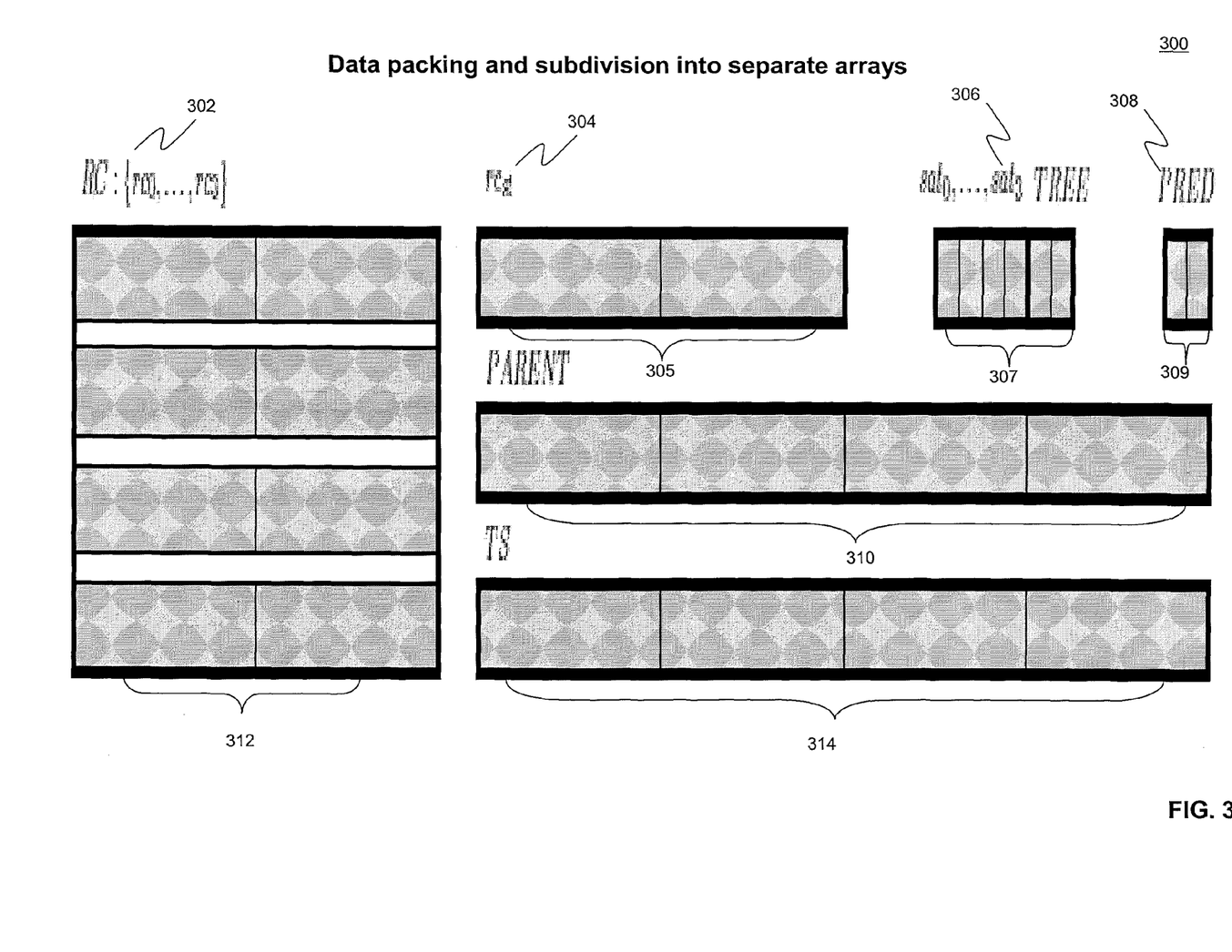
FIG. 3 depicts data packing and subdivision into separate arrays on a 4-connected grid wherein each node is connected to its left, right, top and bottom neighbor, in accordance with an exemplary embodiment of the present invention.

FIG. 3 illustrates data packing and subdivision into separate arrays on a 4-connected grid wherein each node is connected to its left, right, top and bottom neighbor (see, e.g., 302, 304, 306, 308, 310, and 314). As shown in FIG. 3, separate arrays can be allocated and used to store data for individual fields of all nodes, including residual capacities of node's four outgoing edges 312, residual capacity 304 of edge connecting node to terminal, saturation flags of node's outgoing edges 306 packed together with node's tree membership flag into a single field 307, node's parent 310, index 308 of edge connecting the node to its parent, and timestamp 314.

Figure 4:
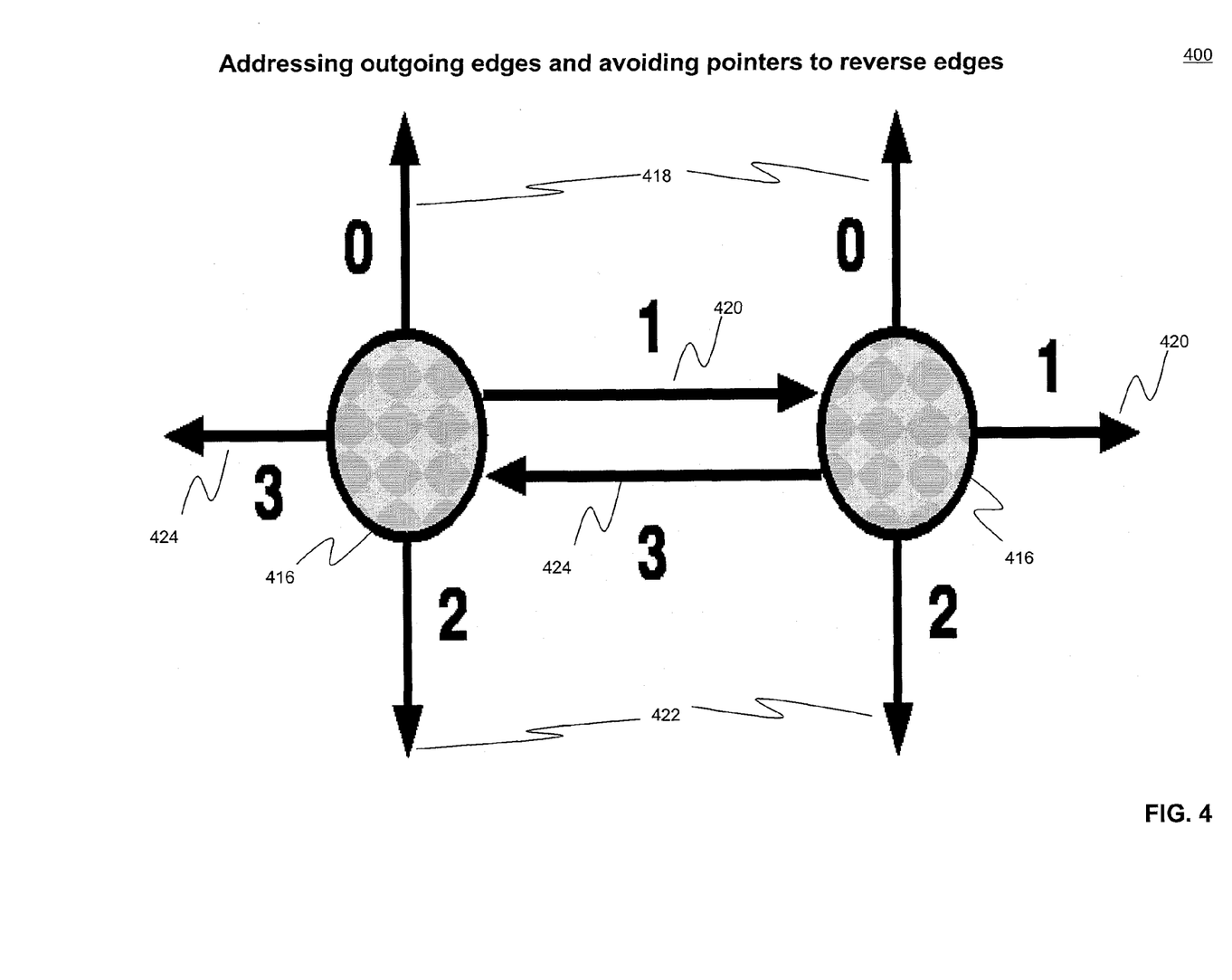
FIG. 4 illustrates addressing outgoing edges and avoiding pointers to reverse edges by using a lookup table, in accordance with an exemplary embodiment of the present invention.

According to certain embodiments of the present methods, systems, and computer readable media, costly dynamic memory allocations are avoided by working inside a pre-allocated memory pool of a conservative size. Each node, such as node 416 in FIG. 4, has a unique index $\{0, \ldots, N-1\}$ and can be grouped with its four outgoing edges having fixed ordering. They are addressed by index $\{0, 1, 2, 3\}$ as illustrated in FIG. 4 (see, e.g., indices 418, 420, 422, and 424 for adjacent nodes 416). Instead of storing pointers to adjacent nodes, certain embodiments of the present methods, systems, and computer readable media compute the indices of node's neighbors on the fly, based on the node's index, as described in more detail below in the discussion of implicit branchless addressing. Another potential advantage of certain embodiments is that unlike traditional methods, they avoid storing pointers to reverse edges. The reverse of a node's outgoing edge is accessed as the neighbor's outgoing edge in the opposite direction. The index of an edge in opposite direction is determined using a small lookup table REV=[2; 3; 0; 1] (see, e.g., FIG. 4). Thus, in an embodiment, for each edge, only the edge's residual capacity is stored (i.e., in main memory 808, secondary memory 810, or removable storage units 818; 822 depicted in FIG. 8). This simplification can be used even in cases when selected nodes or edges are missing. Embodiments can still represent the graph as perfectly 4-connected by assigning a residual capacity of zero to missing edges or to edges adjacent to missing nodes.

Next, according to an embodiment, the actual values of residual capacities are used only during the augmentation phase. In other phases, the only important information is whether a given edge has zero or non-zero residual capacity, i.e., whether it is saturated or not. Reading several bytes worth of single bit of information is wasteful and inefficient. Instead, in an exemplary embodiment, an additional saturation flag, sat, is stored for each edge. This binary flag indicates that the edge has zero residual capacity.

Certain exemplary embodiments of the present methods, systems, and computer readable media include a growth and adoption phase, wherein during the growth and adoption phases the saturation flags are read instead of full residual capacities. During augmentation phase, the saturation flag of an edge is updated whenever the edge becomes either saturated or unsaturated. The additional cost of updating these flags is amortized by fetching less data from memory in the growth and adoption phase.

As the TREE flag and saturation flags $\{sat_0, \ldots sat_3\}$ are often accessed at the same time, embodiments pack them together into a compact single byte structure TREE-SAT. In an embodiment, the first two bits are used to represent the three possible values of the TREE flag and the next four bits are occupied by the saturation flags $\{sat_0, \ldots, sat_3\}$. The last two bits are unused. They are utilized in 6-connected 3D grid graphs. For graphs with higher connectivity, the TREE-SAT structure expands to two or more bytes. In an embodiment, pointers to arrays $\{rc_0, \ldots, rc_3\}$ are aggregated in the four element indirection table RC 302 provided in FIG. 3. The RC 302 table is used for indirect addressing of residual capacities using the edge index $\{0, 1, 2, 3\}$. The residual capacity of each edge is initialized to the edge's capacity. For nodes that are connected to both source and sink, an initial step is to try to push a saturating flow along the source-node-sink augmenting path. After this step, at most one of the two edges remains non-saturated. Residual capacity of the non-saturated edge is then stored as $rc_{st}$. In an embodiment, after initialization, the original capacities of edges are completely discarded.

Cache-Aware Memory Layout

According to an embodiment, fields of a node are grouped together and they are accessed by the node's unique index (see FIG. 3). The individual fields can be stored separately using the Structure of Arrays (SoA) layout. For all nodes, the values of a single field are stored as a separate continuous array in memory (see, e.g., 305, 307, 309, 310, 312, and 314 in FIG. 3). With this layout, the data are naturally split into a 'hot part' and a 'cold part.' For example, when the augmenting path is traversed to determine its minimal residual capacity, only the PARENT index 305, PRED index 309, and the residual capacities need to be accessed. These indices and the residual capacities comprise the hot data. Other fields are not accessed, they comprise the cold data. Since the cold fields are stored at different places in memory, they do not pollute the caches.

Figure 5:
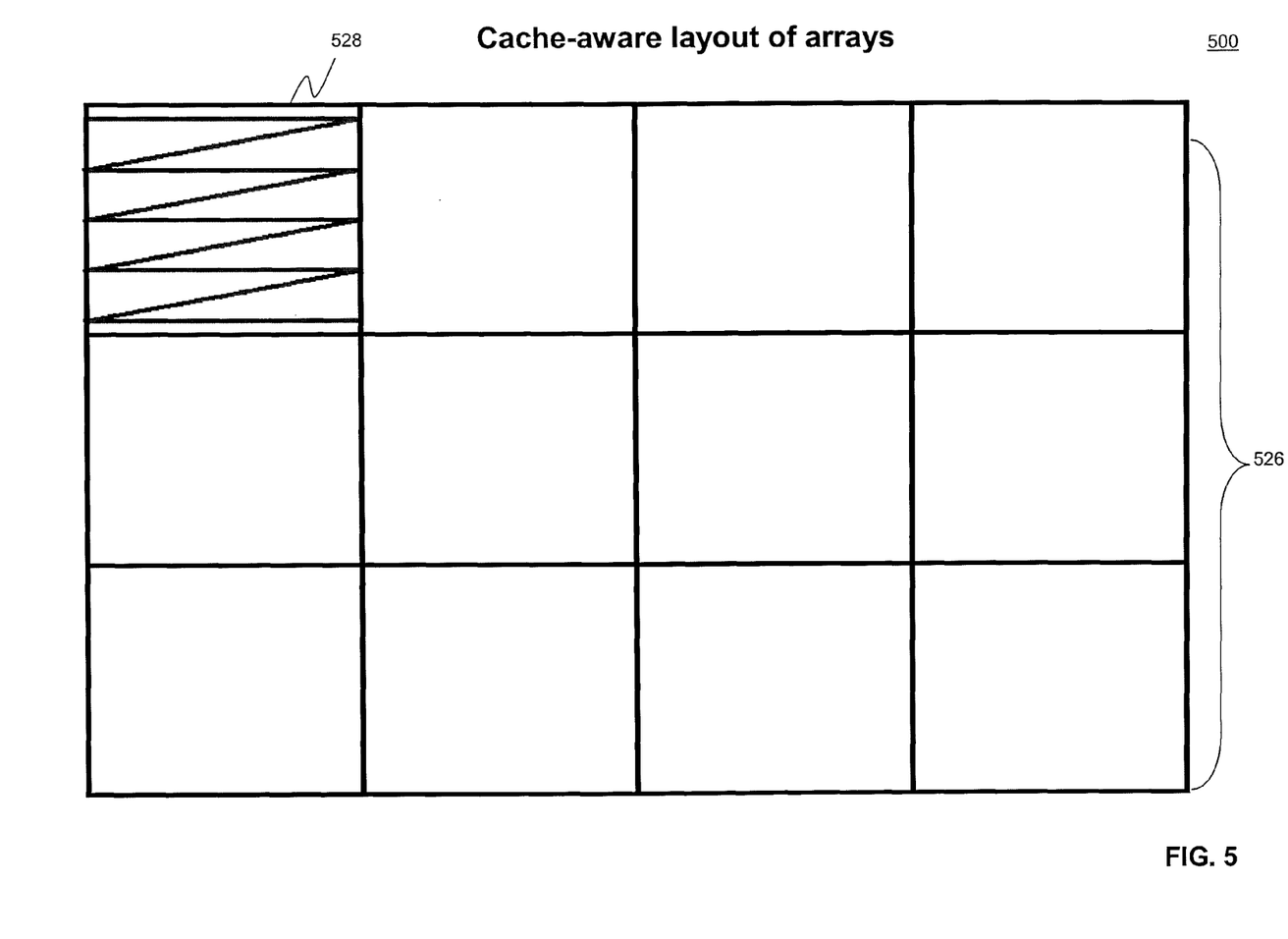
FIG. 5 depicts a cache-aware memory layout of arrays to improve caching behavior, in accordance with an exemplary embodiment of the present invention.

The access pattern during tree growth and path augmentation is irregular, but exhibits certain amount of spatial coherence. As shown in FIG. 5, an embodiment of the present methods, systems, and computer readable media exploits this to improve caching behavior. As shown in FIG. 5, embodiments store each array in a blocked memory layout (500). The grid 500 is divided into blocks of 8×8 nodes (see nodes 526). Fields of nodes that are inside the same block are stored at consecutive memory locations in a scan line order (see 528). Individual blocks are also arranged in a scan line order.

With this layout, a TREE-SAT field for the whole 8×8 block of nodes can fit into single 64-byte cache line. In accordance with an embodiment, the PRED field also fits in a single cache line. According to an embodiment, blocks of 2-byte and 4-byte fields are spread over 2 and 4 cache lines.

This blocked layout can greatly improve the caching behavior. For example, when a TREE-SAT field of some node is accessed for the first time, a cache miss will occur and the field is transferred to the cache along with fields of all nodes lying in the same 8×8 block. If some neighboring node is accessed next, it is likely it will lie in the same block as the previous one. In this case, the neighbor's TREE-SAT field is already in cache, which leads to a cache hit.

The individual arrays are addressed by node's index u. In blocked layout 500, the index of a node with grid coordinates x and y is computed as $$u=((x \bmod 8)+8\cdot(y \bmod 8))+64\cdot(\lfloor x/8 \rfloor+(W/8)\cdot\lfloor y/8 \rfloor).$$

Where W is a width of the padded grid. This can be evaluated efficiently using logical shifts and bitwise conjunctions:

$$u=((x\&7)+((y\&7)<<3)+W\cdot(y>>3).$$

The grid 500 is padded with dummy nodes in each dimension, such that its extents are divisible by 8. Each array is aligned on a 64-byte boundary.

Implicit Branchless Addressing

To avoid stalls due to unpredicted branches, an embodiment of the present methods, systems, and computer readable media replaces branching with conditional moves and small lookup tables. In an embodiment, the index of a left, right, top and bottom neighbor of a node with index u is computed as:

left(u) = u & $000111_b$ ? u −1 : u −57
right(u) = ( ~u) & $000111_b$ ? u +1 : u +57
top(u) = u & $111000_b$ ? u −8 : u −$Y_{ofs}$
bottom(u) = ( ~u) & $111000_b$ ? u +8 : u +$Y_{ofs}$
where $Y_{ofs}$=8. (W −8 +1).

Figure 6:
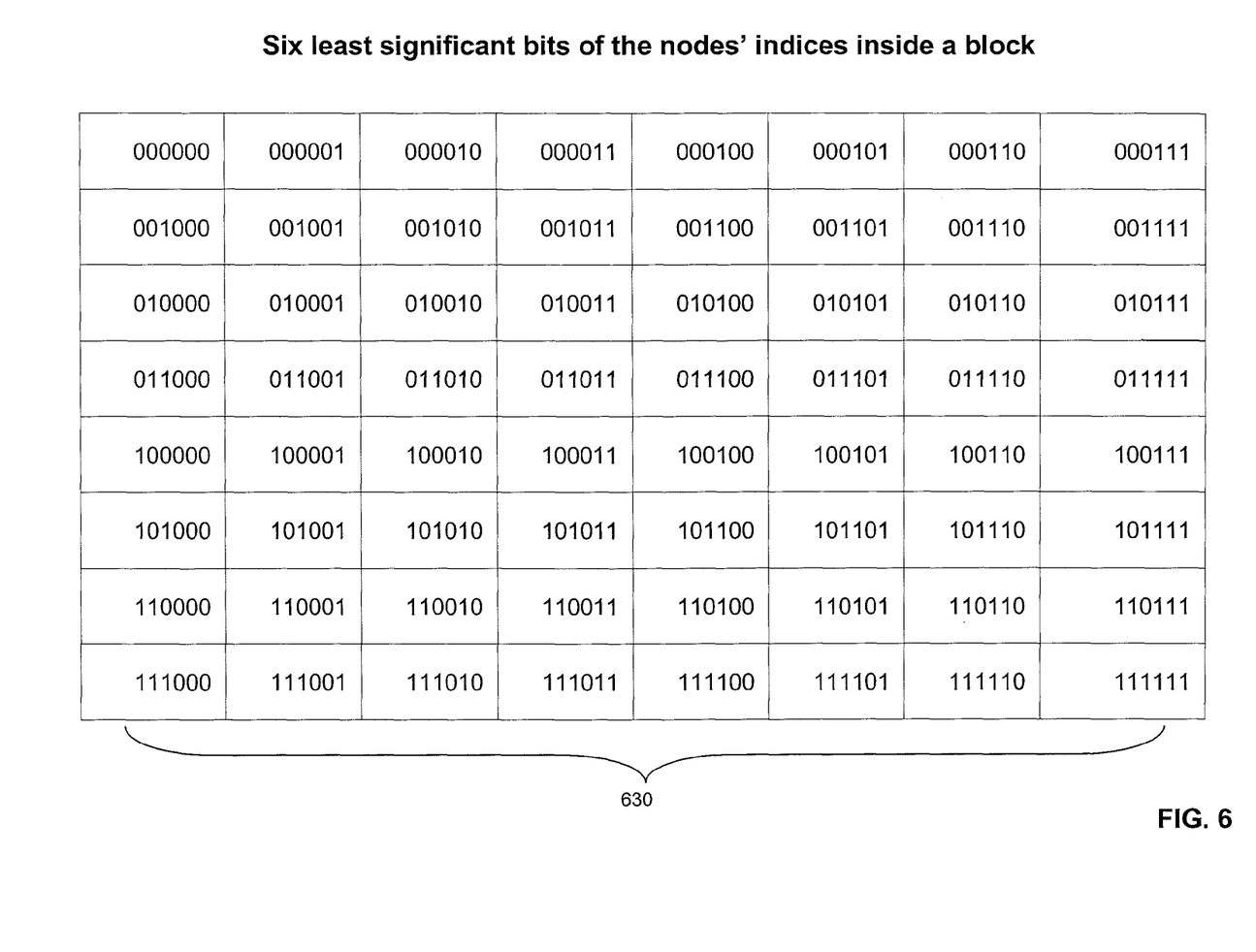
FIG. 6 illustrates six least significant bits of nodes' indices inside a block of 8×8 nodes, in accordance with an exemplary embodiment of the present invention.

The binary constants are used to detect whether the node with index u lies at the block's boundary. As illustrated in the exemplary embodiment of FIG. 6, the six least significant bits of the node's index share specific binary patterns at the block's boundary. For example, the lower three bits are always 000 at the left boundary and higher three bits are always 111 at the bottom boundary (see, e.g., indices 630).

System Embodiment

Figure 1:
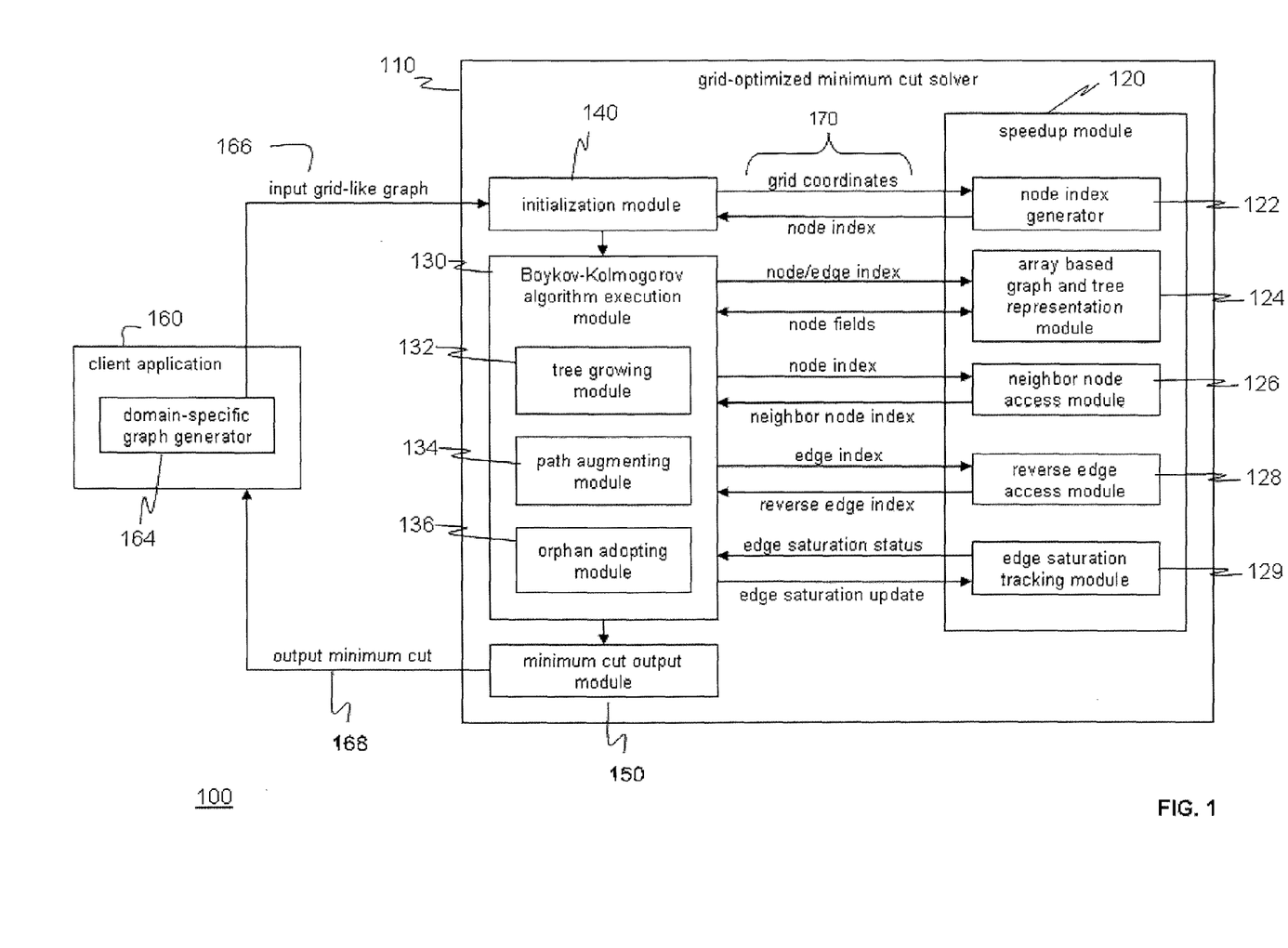
FIG. 1 illustrates an environment for optimized computation of minimum cut, in accordance with an exemplary embodiment of the present invention.

FIG. 1 illustrates an example system 100 for optimizing computation of minimum cut in graphs according to an embodiment of the invention. System 100 includes a grid-optimized minimum cut solver 110 and client application 160. In an embodiment client application 160 can be configured to run on one or more client devices (not shown), that are coupled to the grid-optimized minimum cut solver 110 via a network (not shown). As will be appreciated by persons skilled in the relevant art(s), the network coupling the grid-optimized minimum cut solver 110 to one or more client devices hosting client application 160 may be, but is not limited to, a wireless or wired public or private network, a local area network (LAN), a wide area network (WAN), or the Internet.

According to embodiments, system 100 depicted in FIG. 1 utilizes the following elements: compact, static data structures; a cache-aware memory layout; and implicit branchless addressing. Each of these elements is described in detail in sections following the description of FIG. 1 below.

Grid-optimized minimum cut solver 110 includes an initialization module 140, a Boykov-Kolmogorov (BK) algorithm execution module 130, a speedup module 120, and a minimum cut output module 150. It is to be appreciated that the modules depicted in FIG. 1 may be implemented in hardware, software, firmware or any combination thereof. Client application 160 includes a domain-specific graph generator 164.

According to an embodiment, the computation of minimum cut, such as output minimum cut 168 shown in FIG. 1, is optimized through implementation of an efficient variant of BK algorithm. In an embodiment, the BK algorithm is optimized for graphs with grid-like topologies, such as input grid-like graph 166 shown in FIG. 1. As shown in FIG. 1, input grid-like graph 166 can be received from a client application 160 comprising a domain-specific graph generator 164.

In the example embodiment depicted in FIG. 1, minimum cut output module 150 is hosted by grid-optimized minimum cut solver 110. In an alternative embodiment, minimum cut output module 150 may be separate from and external to grid-optimized minimum cut solver 110.

According to the example embodiment depicted in FIG. 1, client application 160 may execute on a computing device remote from grid-optimized minimum cut solver 110. Such computing device may be for example, implemented as computer system 800 depicted in FIG. 8. The computing device can be, but is not limited to a computer workstation, mobile computing apparatus, or server that is remote from grid-optimized minimum cut solver 110. Alternatively, client application 160 may reside locally on the same computing device with the grid-optimized minimum cut solver 110.

In the example illustrated in FIG. 1, the optimized BK algorithm is executed by the BK algorithm execution module 130. In the embodiment depicted in FIG. 1, the BK algorithm execution module 130 includes tree growing module 132, path augmenting module 134, and orphan adopting module 136.

Speedup module 120 includes node index generator 122, array based graph and tree representation module 124, neighbor node access module 126, reverse edge access module 128 and edge saturation tracking module 129. As illustrated in FIG. 1, there are several data items 170 exchanged between the sub-modules of speedup module 120, initialization module 140 and the sub-modules of the BK algorithm execution module 130. The exchange of specific data items 170 between the modules and sub-modules is described below with continued reference to FIG. 1.

As shown in FIG. 1, in an embodiment, the input grid-like graph 166 is received from the domain-specific graph generator 164 by the initialization module 140. After the initialization module 140 receives the input grid-like graph 166, it performs an initialization of the residual graph and search trees in cooperation with the speedup module 120. The initialization module 140 obtains nodes' indices based on their grid coordinates from the node index generator 122. The initialization module 140 sends node's grid coordinates to the node index generator 122. In response to receiving grid coordinates, the node index generator in turn generates and sends node index to the initialization module 140. After the initialization is complete, the initialization module 140 passes control to the BK algorithm execution module 130.

With continued reference to FIG. 1, the BK algorithm execution module 130 determines the minimum cut in the input graph 166 by executing the computational steps of the BK algorithm. Each iteration of the BK algorithm comprise three phases: growing phase, augmenting phase and adopting phase. These phases are performed by the tree growing module 132, path augmenting module 134 and orphan adopting module 136.

During the minimum cut computation, modules 132, 134 and 136 read and modify information stored in nodes' fields. Access to these fields is provided by the array based graph and tree representation module 124. Upon receiving index of a node from the BK algorithm execution module 130, the array based graph and tree representation module 124 returns a reference to the requested field back to the BK algorithm execution module 130. This reference can be then used by one of the modules 132, 134 or 136 to read or modify value of the node's field.

During the minimum cut computation, modules 132, 134 and 136 also need access to neighboring nodes and reverse edges. Access to node's neighbors is provided by the neighbor node access module 126. The BK algorithm execution module 130 first sends the node index to the neighbor node access module 126, which in turn computes the index of neighboring node and sends it back to the BK algorithm execution module 130.

Modules 132 and 136 query the saturation of residual graph's edges during the minimum cut computation. The BK algorithm execution module 130 receives the edge's saturation status from the edge saturation tracking module 129.

Module 136 also updates the saturation status of edges. The saturation status of an edge is changed by the edge saturation tracking module 129 in response to receiving edge saturation update from the BK algorithm execution module 130.

In an embodiment, after determining the minimum cut, the BK algorithm execution module 130 passes control to the minimum cut output module 150.

In the example embodiment illustrated in FIG. 1, the minimum cut output module 150 forwards the output minimum cut 168 back to the client application 160.

Method for Speeding up the Minimum Cut Computation

Figure 7:
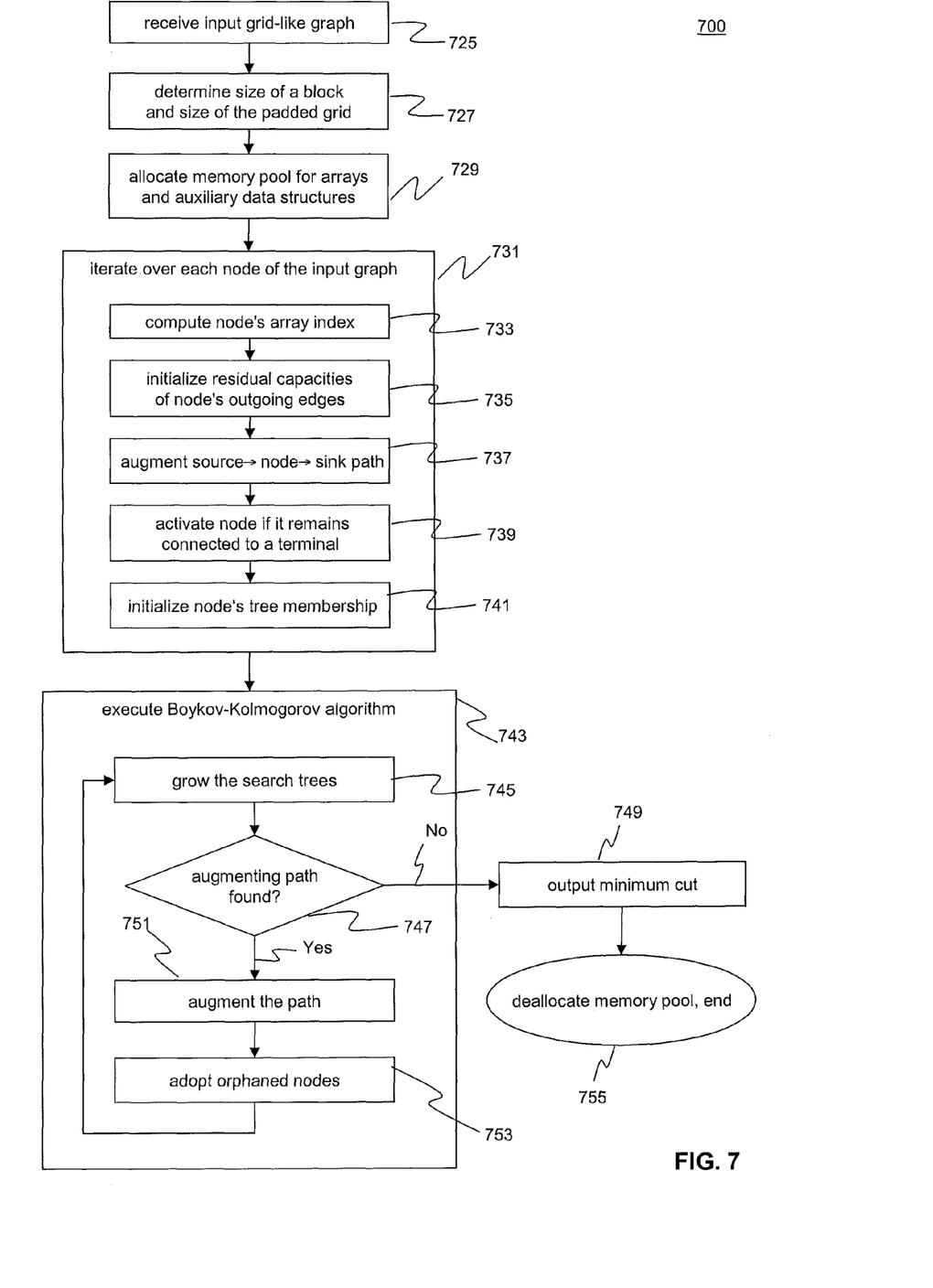
FIG. 7 is a flowchart representing a method for optimizing computation of minimum cut in grid-like graphs, according to an exemplary embodiment of the invention.

FIG. 7 is a flowchart 700 illustrating steps involved in speeding up the minimum cut computation for graphs with grid-like topologies, in accordance with an exemplary embodiment of the present methods, systems, and computer readable media.

More particularly, flowchart 700 illustrates the steps by which optimized minimum cut computation is performed, as described above and depicted in FIGS. 1 and 3-6. Flowchart 700 is described with reference to the embodiments of FIGS. 1 and 3-6. However, flowchart 700 is not limited to those example embodiments. Note that the steps in the flowchart do not necessarily have to occur in the order shown.

The method begins at step 725 where an input grid-like graph is received. In an embodiment, this step comprises receiving input grid-like graph 166 from the domain-specific graph generator 164 described above with reference to FIG. 1. Step 725 can be performed by initialization module 140. After the input grid-like graph is received, the method proceeds to step 727.

In step 727, a size of a block and size of the padded grid is determined. According to an embodiment, this step can be performed by speedup module 120. After the sizes of the block and padded grid are determined, the method proceeds to step 729.

In step 729, memory pool is allocated for arrays and auxiliary data structures. According to embodiments, arrays 305, 307, 309, 310, 312 and 314 described above with reference to FIG. 3 are allocated in this step. In an embodiment, step 729 comprises allocating the compact and static data structures described above with reference to FIG. 3. After a memory pool is allocated for arrays and the auxiliary data structures, control is passed to step 731.

In step 731, for each node of the grid-like graph input in step 725, steps 733-741 are iterated. Thus, step 731 comprises repeating steps 733-741 for each node in the input grid-like graph. In embodiments, steps 733-741 can be performed by initialization module 140. Steps 733-741 are described in relation to a 'current node' being processed in the input grid-like graph received in step 725. Each of these iterated steps are described below.

In step 733, an array index is computed for the current node. In accordance with an embodiment, this step can be performed by node index generator 122 described above with reference to FIG. 1. After the node's array index is computed, the method proceeds to step 735.

In step 735, the residual capacities of the current node's outgoing edges are initialized. According to an embodiment, the residual capacities (rc) are initialized to the values of input graph edges' capacities. After initializing the residual capacities of the node's outgoing edges, the method proceeds to step 737.

In step 737, the path from a source terminal through the node to a sink terminal is augmented. According to an embodiment, this step can be performed by initialization module 140 in cooperation with speedup module 120 described above with reference to FIG. 1. After the path from a source terminal to a sink terminal through the current node is augmented, the method proceeds to step 739.

In step 739, the current node is activated if it remains connected to a terminal. In this step, if is determined that the current node is still connected to a terminal, the node is activated and control is passed to step 741. If it is determined that the current node is no longer connected to a terminal, then the method proceeds to step 741 without activating the node.

In step 741, the current node's tree membership is initialized. In accordance with an embodiment, this step can be performed by initialization module 140 in cooperation with array based graph and tree representation module 124. After the node's tree membership is initialized, control is passed to step 743.

In step 743, the BK algorithm is executed. According to an embodiment, this step can be performed by the BK algorithm execution module 130. As shown in FIG. 7, step 743 comprises steps 745-753. Each of these steps is described below.

In step 745, the search trees are grown. In an embodiment, this step can be performed by tree growing module 132 when it is invoked by the BK algorithm execution module 130. The trees are grown by expanding active nodes to their neighbors. Indices of neighboring nodes can be retrieved from the neighbor node access module 126 based on the index of expanded node. Search trees are grown to neighboring nodes that are connected to active nodes by non-saturated edges only. Saturation status of node's outgoing edge can be retrieved from the edge saturation tracking module 129. When saturation status of the reverse edge is queried instead, the reverse edge's index can be obtained from the reverse edge access module 128 first. Access to individual fields of each node can be provided by the array based graph and tree representation module 124. After the search trees are grown, control is passed to step 747.

In step 747, an evaluation is made regarding whether an augmenting path has been found. In this step, if it is determined that an augmenting path has not been found, this means that the minimum cut has been determined and control is passed to step 749 where the minimum cut is output. If it is determined that an augmenting path has been found, then control is passed to step 751.

In step 751, the path is augmented. According to an embodiment, step 751 can be performed by path augmenting module 134 when it is invoked by the BK algorithm execution module 130. Path augmentation is performed by traversing each tree to its root, decrementing residual capacities of edges in the path direction and incrementing residual capacities of reverse edges. Access to nodes' fields, which contain the residual capacities and trees' structure, can be provided by the array based graph and tree representation module 124. When reverse edge is accessed, its index is retrieved from the reverse edge access module 129 first. During augmentation, at least one of the edges along the path becomes saturated. Saturation status of these edges can be updated by the edge saturation tracking module 129. Nodes that are connected to their parents by saturated edges are orphaned. After the path is augmented the method proceeds to step 753.

In step 753, orphan nodes are adopted. In accordance with an embodiment, this step can be performed by orphan adopting module 136. During adoption, search for a new parent is performed for each orphaned node. The search tries to find the parent among orphaned node's neighbors, which are connected by non-saturated edges and reside in the same tree as the orphaned node. Indices of node's neighbors can be retrieved from the neighbor node access module 126. Edges' saturation status can be obtained from the edge saturation tracking module 129. If no parent was found the node's tree membership is changed, otherwise the tree structure is updated. Trees' structure and tree membership of each node is contained in nodes' fields. Access to these fields can be provided by the array based graph and tree representation module 124. After any orphan nodes are adopted, control is passed back to step 745.

In step 749, the minimum cut is output. In an embodiment, step 749 can be performed by minimum cut output module 150, which forwards the output minimum cut identified in step 747 to the client application 160. After the minimum cut is output, the method proceeds to step 755 where the memory pool allocated in step 729 is de-allocated and the method ends.

Example Computer System Implementation

Figure 8:
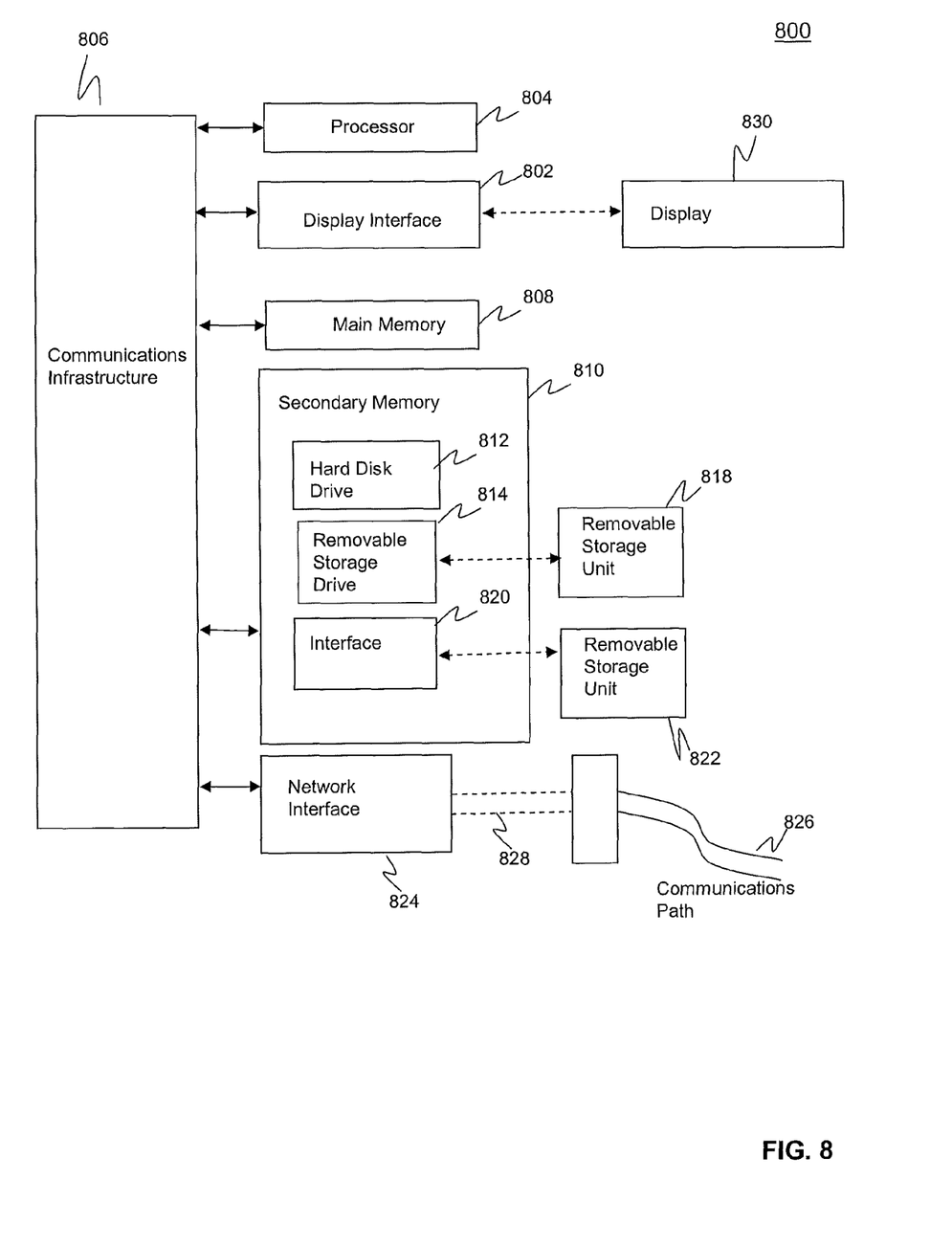
FIG. 8 depicts an exemplary computer system in which the present invention may be implemented.

Various aspects of the present methods, systems, and computer readable media can be implemented by software compiled in a process to form a specific purpose computer, firmware, hardware, or a combination thereof. FIG. 8 illustrates an example computer system 800 in which the present methods, systems, and computer readable media, or portions thereof, can be implemented as computer-readable code stored on a computer readable media that when read can carry out the functions and process identified herein. For example, system 100 of FIG. 1 and the methods illustrated by flowchart 700 of FIG. 7 can be implemented in computer system 800 using hardware, compiled software, firmware, non-transitory computer readable media having instructions stored thereon, or a combination thereof and may be implemented in one or more computer systems or other processing systems.

Various embodiments of the invention are described in terms of this example computer system 800.

After reading this description, it will become apparent to a person skilled in the relevant art how to implement the invention using other computer systems and/or computer architectures.

A computer system 800 includes one or more processors, such as a processor 804. A processor 804 can be a special purpose or a general purpose processor. The processor 804 is connected to a communication infrastructure 806 (for example, a bus, or network).

The computer system 800 also includes a main memory 808, preferably random access memory (RAM), and may also include a secondary memory 810. The secondary memory 810 may include, for example, a hard disk drive 812, a removable storage drive 814, flash memory, a memory stick, and/or any similar non-volatile storage mechanism. The removable storage drive 814 may comprise a floppy disk drive, a magnetic tape drive, an optical disk drive, a flash memory, or the like. The removable storage drive 814 reads from and/or writes to a removable storage unit 815 in a well known manner The removable storage unit 815 may comprise a floppy disk, magnetic tape, optical disk, etc. which is read by and written to by the removable storage drive 814. As will be appreciated by persons skilled in the relevant art(s), the removable storage unit 815 includes a non-transitory computer usable storage medium having stored therein computer software and/or data.

In alternative implementations, secondary memory 810 may include other similar means for allowing computer programs or other instructions to be loaded into the computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system 800.

The computer system 800 may also include a communications interface 824. The communications interface 824 allows software and data to be transferred between computer system 800 and external devices. The communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. The communications path 826 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to the computer system 800.

Computer programs (also called computer control logic) are stored in the main memory 808 and/or the secondary memory 810. Computer programs may also be received via the communications interface 824. Such computer programs, when executed, enable the computer system 800 to implement the present methods, systems, and computer readable media as discussed herein. In particular, the computer programs, when executed, enable processor 804 to implement the processes of the present methods, systems, and computer readable media, such as the steps in the methods illustrated by flowchart 700 of FIG. 7 discussed above. Accordingly, such computer programs represent controllers of the computer system 800. Where the methods, systems, and computer readable media are implemented using software, the software may be stored in a computer program product and loaded into the computer system 800 using the removable storage drive 814, interface 820, hard drive 812, or communications interface 824.

The methods, systems, and computer readable media can also be implemented computer program products comprising software stored on any computer useable medium. Such software, when executed in one or more data processing device, causes a data processing device(s) to operate as described herein. Embodiments of the invention may employ suitable computer useable or readable medium, known now or developed in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, in the above embodiments and description, the invention has been described with reference to particular examples, such as graphs having topology of a 2-dimensional 4-connected grid. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method of speeding up computation of a minimum cut in a graph with a topology of an n-dimensional k-connected grid, wherein the computation is performed using a variant of the Boykov-Kolmogorov algorithm, the method comprising:

determining a size of an n-dimensional rectangular block;
padding the grid with a number of dummy nodes to make the extents of the grid evenly divisible by the size of the block in each dimension;
dividing the grid into blocks of a determined size;
representing a residual graph without explicit connectivity information, wherein the connectivity information is determined on the fly and is based on the graph's known regular structure;
associating a set of fields with each node, wherein the fields comprise:
  residual capacities of the node's k outgoing edges;
  a residual capacity of an edge connecting the node to a terminal;
  a tree membership field indicating the node's membership to one of the search trees;
  an index of the node's parent node;
  an index of an edge connecting the node to its parent; and
  the node's timestamp;
arranging the fields associated with each node into separate arrays, wherein each array corresponds to a single field and each array element corresponds to a single node;
assigning an array index to each node based on the node's grid coordinates;
defining a fixed ordering of the node's k outgoing edges;
assigning an integer index to each of the node's k outgoing edges based on the fixed ordering;
accessing the node's neighbors by computing the neighbors' array indices based on the array index of the node; and
accessing the reverse edge of the node's outgoing edge by determining the integer index of the neighbor's outgoing edge in the opposite direction.

2. The method of claim 1, wherein the size of the block is determined such that the block's extent is a power of two in each dimension and the number of nodes inside the block is equal to the size of a cache line.

3. The method of claim 1, wherein the array indices are assigned to the nodes by:
proceeding through the blocks in a scan line order; and
assigning consecutive array indices to the nodes inside each block in a scan line order.

4. The method of claim 3, wherein the node's assigned array index is computed based on the node's grid coordinates by performing operations comprising: additions, multiplications, logical shifts, and bitwise conjunctions.

5. The method of claim 1, wherein the array indices of the node's neighbors are computed based on the node's array index by performing operations comprising: additions, bitwise negations, bitwise conjunctions, and conditional moves.

6. The method of claim 1, wherein the integer index of the reverse edge is determined based on the integer index of the edge using a lookup table.

7. The method of claim 1, wherein a saturation status of the k outgoing edges is represented by an additional k-bit saturation field, wherein the saturation field is updated whenever the saturation status of any of the outgoing edges changes.

8. The method of claim 7, wherein the saturation field is merged with the node's tree membership field and the merged field is arranged into a single array.

9. The method of claim 1, wherein the first element of each array is aligned at an address evenly divisible by the size of a cache line.

10. The method of claim 1, wherein the arrays and auxiliary data structures are stored in a pre-allocated memory pool of finite size.

11. A non-transitory computer readable storage medium having instructions stored thereon that, in response to execution by a computing device, cause the computing device to perform operations for speeding up computation of a minimum cut in a graph with a topology of an n-dimensional k-connected grid, wherein the computation is performed using a variant of the Boykov-Kolmogorov algorithm, comprising:
  determining a size of an n-dimensional rectangular block;
  padding the grid with a number of dummy nodes to make the extents of the grid evenly divisible by the size of the block in each dimension;
  dividing the grid into blocks of a determined size;
  representing a residual graph without explicit connectivity information, wherein the connectivity information is determined on the fly and is based on the graph's known regular structure;
  associating a set of fields with each node, wherein the fields comprise:
    residual capacities of the node's k outgoing edges;
    a residual capacity of an edge connecting the node to a terminal;
    a tree membership field indicating the node's membership to one of the search trees;
    an index of the node's parent node;
    an index of an edge connecting the node to its parent; and
    the node's timestamp;
  arranging the fields associated with each node into separate arrays, wherein each array corresponds to a single field and each array element corresponds to a single node;
  assigning an array index to each node based on the node's grid coordinates;
  defining a fixed ordering of the node's k outgoing edges;
  assigning an integer index to each of the node's k outgoing edges based on the fixed ordering;
  accessing the node's neighbors by computing the neighbors' array indices based on the array index of the node; and
  accessing the reverse edge of the node's outgoing edge by determining the integer index of the neighbor's outgoing edge in the opposite direction.

12. The computer readable storage medium of claim 11, wherein the size of the block is determined such that the block's extent is a power of two in each dimension and the number of nodes inside the block is equal to the size of a cache line.

13. The computer readable storage medium of claim 11, wherein the array indices of the node's neighbors are computed based on the node's array index by performing operations comprising: additions, bitwise negations, bitwise conjunctions, and conditional moves.

14. The computer readable storage medium of claim 11, wherein the integer index of the reverse edge is determined based on the integer index of the edge using a lookup table.

15. The computer readable storage medium of claim 11, wherein a saturation status of the k outgoing edges is represented by an additional k-bit saturation field, wherein the saturation field is updated whenever the saturation status of any of the outgoing edges changes.

16. The computer readable storage medium of claim 15, wherein the saturation field is merged with the node's tree membership field and the merged field is arranged into a single array.

17. The computer readable storage medium of claim 11, wherein the first element of each array is aligned at an address evenly divisible by the size of a cache line.

18. The computer readable storage medium of claim 11, wherein the arrays and auxiliary data structures are stored in a pre-allocated memory pool of finite size.

19. A minimum cut computation system comprising:
  a processor; and
  a memory arranged to store executable instructions to cause the processor to speed up computation of a minimum cut in a graph with a topology of an n-dimensional k-connected grid, wherein the computation is performed using a variant of the Boykov-Kolmogorov algorithm by performing operations comprising:
  determining a size of an n-dimensional rectangular block;
  padding the grid with a number of dummy nodes to make the extents of the grid evenly divisible by the size of the block in each dimension;
  dividing the grid into blocks of a determined size;
  representing a residual graph without explicit connectivity information, wherein the connectivity information is determined on the fly and is based on the graph's known regular structure;
  associating a set of fields with each node, wherein the fields comprise:
    residual capacities of the node's k outgoing edges;
    a residual capacity of an edge connecting the node to a terminal;
    a tree membership field indicating the node's membership to one of the search trees;
    an index of the node's parent node;
    an index of an edge connecting the node to its parent; and
    the node's timestamp;
  arranging the fields associated with each node into separate arrays, wherein each array corresponds to a single field and each array element corresponds to a single node;
  assigning an array index to each node based on the node's grid coordinates;
  defining a fixed ordering of the node's k outgoing edges;
  assigning an integer index to each of the node's k outgoing edges based on the fixed ordering;
  accessing the node's neighbors by computing the neighbors' array indices based on the array index of the node; and
  accessing the reverse edge of the node's outgoing edge by determining the integer index of the neighbor's outgoing edge in the opposite direction.

20. The system of claim 19, wherein the node's assigned array index is computed based on the node's grid coordinates by performing operations comprising: additions, multiplications, logical shifts, and bitwise conjunctions.

* * * * *